United States Patent

Feldman et al.

[15] 3,683,343
[45] Aug. 8, 1972

[54] DEMAND METERING SYSTEM FOR ELECTRIC ENERGY

[72] Inventors: Stephen Feldman; Williard Graves, both of Baltimore, Md.

[73] Assignees: Evirometrics, Inc.; Richard Rubin, Arlington, Va. ; part interest to each

[22] Filed: July 27, 1970

[21] Appl. No.: 58,597

[52] U.S. Cl. ............. 340/178, 324/116, 235/151.21, 340/310
[51] Int. Cl. ............................................. H04m 11/04
[58] Field of Search .340/178, 179, 310; 235/151.31, 235/151.21; 324/103, 115, 116

[56] References Cited

UNITED STATES PATENTS

| | | | |
|---|---|---|---|
| 3,540,030 | 11/1970 | Hartz | 340/169 |
| 3,359,551 | 12/1967 | Dennison | 340/310 |
| 1,138,513 | 5/1915 | Stempel | 324/116 |
| 2,415,653 | 2/1947 | Ogurkowski | 324/116 |

Primary Examiner—John W. Caldwell
Assistant Examiner—Robert J. Mooney
Attorney—Le Blanc & Shur

[57] ABSTRACT

Disclosed is a variable rate electric metering system including electric meters selectively operable at three or more speeds, and a meter remote control system having a control signal generator at the power station to transmit a multi-tone control code reflective of overall system demand over the powerlines and receiving means associated with each meter responsive to the tones to adjust the meter speed. A consumer cost display unit is provided to give an indication of both overall system demand and actual customer power consumption in terms of dollars per hour spent. Wired-in and portable cost display units are disclosed.

25 Claims, 6 Drawing Figures

PATENTED AUG 8 1972 3,683,343

INVENTORS
STEPHEN L. FELDMAN
WILLARD L. GRAVES, JR.

BY Le Blanc & Shur

ATTORNEYS

PATENTED AUG 8 1972　　　　　　　　　3,683,343
SHEET 2 OF 2
FIG.2
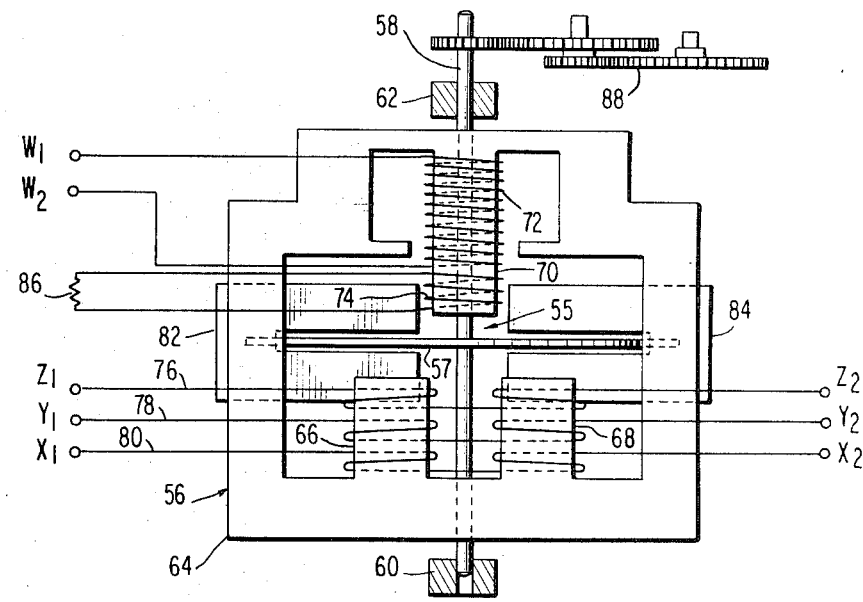
FIG.3
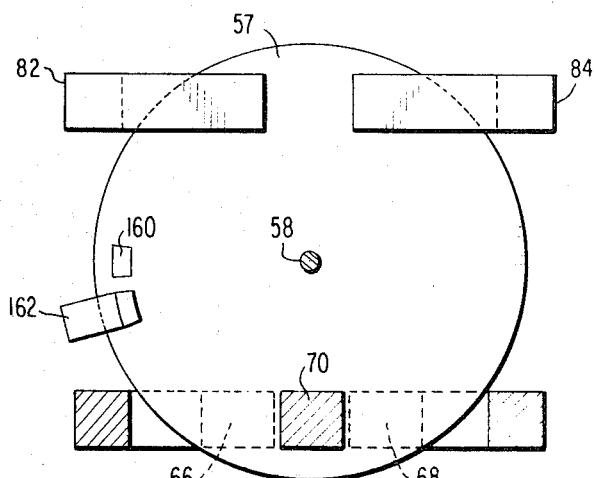
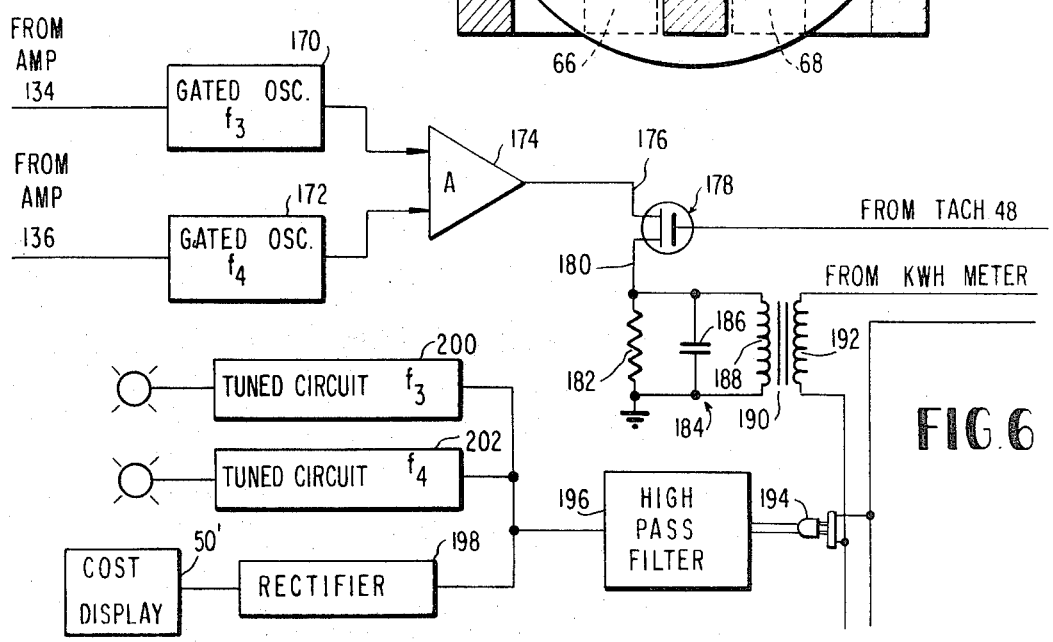
FIG.6

DEMAND METERING SYSTEM FOR ELECTRIC ENERGY

INTRODUCTION

The present invention relates to a demand metering system for electrical energy which is economically and technically feasible and practical for wide scale use in commercial and residential power distribution.

As is well known, electricity is customarily metered and sold on an energy basis, e.g., at a given rate per kilowatthour delivered. This practice is quite satisfactory, and excellent highly standardized metering equipment is available at relatively low cost. However, various economic and technical considerations have long indicated that sale of electricity on a basis other than per unit of energy may have significant advantages from the standpoint of both consumer and company.

In particular, consumer demand patterns vary so that the utility is faced with periods of high and low demand. High demand may be created either by short term heavy consumption by a particular customer (usually, an industrial or commercial customer) or simply by the normal living patterns of the large number of domestic consumers comprising the community being served. Because of this, generating capacity must be sufficient to meet maximum expected loads on a peak demand basis if adequate service is to be provided. System capacity is ordinarily calculated to be 100 percent above the average hourly demand, but this is actually insufficient reserve in light of current increases in power consumption, and the substantial time lag between initiation of a capacity expansion project and availability of the additional capacity. Yet additional excess capacity is seldom provided; this has been attributed to rate restrictions imposed by regulatory bodies, and other economic factors.

Since capacity requirements are calculated on a short term basis, it has been recognized that any means to spread demand will have the same effect as increasing capacity, or stated differently, can delay for time the need for capital expansion. Efforts at moral restraint, i.e., requests that domestic customers voluntarily limit consumption at critical hours of peak demand, are not effective, so price differential billing which rewards consumption shifts to times of lowe demand have been given serious consideration.

Actually, pricing solely on the basis of units of energy consumed is discriminatory to a customer whose consumption is principally during periods of low demand, since the cost of generating electrical energy during slack periods is considerably less than during periods of high demand. By charging the low demand period customer at the same rate as the higher demand period customer, the former in effect subsidizes the latter. Differential pricing would thus be more equitable from a consumer standpoint.

For customers with high power consumption, i.e., customers who consume energy at a high rate, so-called "demand metering" techniques are often applied based on maximum power consumed over a measuring period. Suitable metering equipment is available, but high demand use of this kind cannot ordinarily be shifted, so demand metering does not solve the problem of providing an economic incentive for shifting demand patterns of residential consumers. Thus, demand metering systems of this type have not come into general use.

Other demand metering systems have been proposed for primarily residential use based on a variable billing rate per unit of energy depending on the overall power demands made on the system. Unfortunately, however, such systems have proved impractical due to high cost of purchasing and/or installing the electric meters, etc. For example, one remotely controlled demand metering technique known for many years contemplates varying the operating rate of the individual meters on a continuous basis depending on the overall load of the system, with remote control information being provided from the power station to the consumer location by a set of signalling wires separate from the power line itself. Apart from the cost of the meters, and the need for an extra set of wires, providing the consumer with a continuously variable rate structure appears unsatisfactory. Human engineering studies indicate the average person to be unable to respond meaningfully even to a relatively small number of choices; the practical limit appears to be about seven alternatives. On the other hand, it has also been shown that providing the consumer with two options (e.g., a high billing and a low billing rate) does not produce the desired spreading of demand, but merely shifts the entire demand pattern so that the peak demand occurs at a different time.

The present invention seeks to overcome the above disadvantages of previously known demand metering systems by providing a convenient and inexpensive metering system in which the billing rate is adjusted on the basis of the overall system load. At the same time, the invention provides the consumer with a facility to adjust his pattern of consumption and with decision-making information to which an ordinary person is capable of responding in a meaningful and effective fashion.

BRIEF DESCRIPTION OF INVENTION

Briefly, in accordance with the present invention, there is provided a watthour meter of essentially standard design modified to permit registering of energy consumed at any one of several different rates to reflect different levels of demand in the system. The meter, though calibrated in kilowatthours, actually may record a number of kilowatthours greater than that actually consumed. For example, at times of low demand, actual kilowatthours consumed are recorded. At times of higher demand, a scale factor such as 1.5 may be applied whereby the meter would record 1.5 kilowatthours for each kilowatthour consumed. At times of even higher demand, a scale factor of 2 might be applied whereby the meter would record usage of 2 kilowatthours for each kilowatthour actually consumed. Remote control is provided from the power station to each meter to determine the scale factor by suitably coded signals transmitted directly over the power line and decoded by suitable sensing and decoding equipment associated with each meter.

A display unit is provided on the consumer premises for convenient use in adjusting power consumption. The display provides an indication of overall system demand, for example, by panel illumination, color or an illuminated indicator, as well as an indication of the individual consumer's electricity consumption on a cost per unit of time basis. This permits immediate appreciation of the cost reduction being achieved by delaying or ceasing the use of a particular electrical appliance at a time of high overall demand.

The cost display unit may be wired-in, or portable, adapted to be plugged into a convenient power outlet. For the latter arrangement, suitable means are provided for transmitting cost and demand information signals through the house wiring.

Accordingly, it is an object of this invention to provide an improved demand metering system for electrical energy.

It is another object of this invention to provide such a demand metering system in which an electrical meter is arranged to operate at one of several different rates to reflect variations in overall electricity demand throughout the system. It is a related object of this invention to provide such a demand metering system in which control of the operating rate of the consumption meter is effected by signals provided over the power lines from the power generating station.

An additional object of this invention is to provide a demand metering system for electrical energy including a variable rate meter and a cost display unit at each consumer location whereby the consumer may readily assess the effect of a change in his own electrical consumption.

A further object of the invention is to provide such a demand metering system in which cost display is provided by a wired-in unit or by portable unit adapted for connection to convenient power outlet by means of a conventional plug.

An additional object of this invention is to provide a metering system as described above including means at a power station for transmitting multi-tone control signals over the power lines, variable rate metering apparatus at each consumer premises, meter rate control equipment associated with each meter responsive to the control tones, and display apparatus to provide each customer with readily comprehensible information as to overall system power demands and as to his own power consumption in terms of dollars per hour cost.

The exact nature of this invention, together with other objects and advantages thereof will become apparent from consideration of the following detailed description in conjunction with the drawing in which:

FIGS. 2 and 3 are drawings showing a watthour meter constructed in accordance with this invention;

FIG. 6 is a circuit diagram showing the construction of a portable operating cost display unit including the power line transmitter apparatus and the portable display unit.

Figure 1:
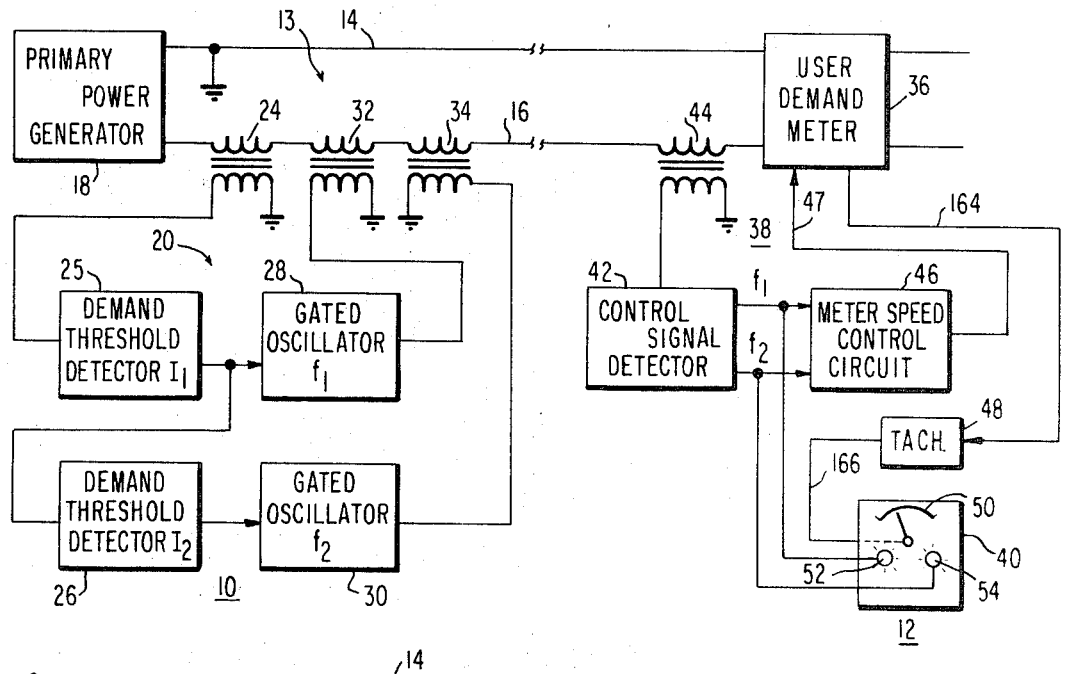
FIG. 1 is a block diagram showing the overall arrangement of the demand metering system in accordance with this invention.

Turning now to FIG. 1, there is shown a power distribution network including power station 10, and one of many consumer locations 12 connected by a power line 13 shown for simplicity as a two-wire line having a ground side 14 and a hot side 16.

Included in power station 10, is a primary power generator 18 of any conventional or desired type and meter control signal generating equipment generally denoted at 20. The latter comprises an input transformer 24, first and second system demand level detectors 25 and 26, and a pair of gated oscillators 28 and 30 controlled by detectors 25 and 26, and coupled to power line 13 by a pair of transformers 32 and 34, respectively.

Oscillators 28 and 30 provide a two-tone signalling code for control of the operating or registration rate of the individual consumer's meters. Preferably, a three level code is used: the presence of the $f_1$ signal of oscillator 28 or the $f_2$ signal from oscillator 30 connoting two different levels of demand, e.g., moderate and high, and the absence of either the $f_1$ or the $f_2$ signal connoting low demand. As will be appreciated, however, other codes may be employed such as a four level code in which simultaneous presence of both the $f_1$ and $f_2$ signals represents the fourth level. Greater numbers of tones may also be employed if desired.

Included at consumer location 12 is a demand meter 36, control apparatus 38, and a consumer cost display unit 40. Demand meter 36 is preferably similar in construction conventional watthour meters, but with certain modifications hereinafter described to provide control of the meter registration rate.

Meter control apparatus 38 comprises a control signal detector 42 coupled to the hot side of power line 13 by a transformer 44, and a meter speed control circuit 46 connected to the $f_1$ and $f_2$ outputs of control signal detector 42. The latter is connected to meter 36 by a signal path 47 to control the meter registration rate.

The user cost display is provided by a suitable meter 50 in display unit 40. The meter is operated by a tachometer 48 connected to measure the operating speed of demand meter 36. As hereinafter explained, the scale of the meter is calibrated in units of cents per hour or other convenient cost per unit of time to permit ready comprehension by the user.

Display unit 40 also includes means for indicating overall system demand. This is accomplished by a pair of lamps 52 and 54 connected respectively to the $f_1$ and $f_2$ outputs of control signal detector 42.

Lamps 52 and 54 are arranged to illuminate respective indicia bearing display elements identifying the demand level, e.g., "Moderate" and "High" in suitably discernible fashion. A third lamp (not shown) may be provided if desired to indicate low demand when neither the $f_1$ nor the $f_2$ signal is present.

Alternatively, the lamps may be arranged to illuminate the scale of meter 50 to provide the overall demand indication either in conjunction with or as a substitute for the aforementioned indicia bearing elements.

The construction of user demand meter 36 is shown in some detail in FIGS. 2 and 3. The meter is generally similar to conventional kilowatthour meters, and includes an outer casing (not shown), a rotor 55 and a stator 56. Rotor 55 comprises an aluminum disc 57 mounted on a shaft 58 supported at opposite ends by suitable bearings 60 and 62. Stator 56 comprises a magnetizable steel frame 64 having first and second lower poles 66 and 68, a third upper pole 70, spaced on opposite sides or rotor disc 57 as well as five sets of windings 72, 74, 76, 78 and 80 hereinafter described.

As shown particularly in FIG. 3, rotor 55 and stator 56 are so positioned that a magnetic field generated in stator 56 passes through a segmental portion of the rotor. A pair of permanent magnets 82 and 84 are positioned adjacent rotor disc 57 to interact with a segment of the disc diametrically opposite to the portion of the disc which interacts with the stator magnetic field.

As will be understood, windings 72 – 80 generate a magnetic field for operating the meter. Conventionally, meters of the type shown include a current coil 76 wound on stator poles 66 and 68 and a potential coil 72 wound on stator pole 70. Coil 76 has a small number of turns, while coil 72 has many turns and is highly inductive. An additional coil 74 is also provided on stator pole 70 and is terminated by a shorting resistor 86 selected to produce exact phase quadrature between the magnetic field produced by pole 70 and the fields produced by poles 66 and 68 when the power factor resulting from the loads attached to the power line is unity.

The foregoing is quite conventional and the meter described will operate as an ordinary watthour meter if connected to a power line with current coil 76 in series with the "hot" side of the line, and potential coil 72 across the line. Thus, with resistor 86 properly selected, the stator magnetic field will produce a torque on disc 57 proportional to the power drawn from the line. Permanent magnets 82 and 84 produce a drag on disc 57 proportional to the rotational speed due to interaction with the eddy currents induced in the disc by the stator field, thus maintaining a constant rotational speed, whereby a single rotation represents a fixed quantity of energy. Shaft 58 operates a gear train 88 connected to a conventional registration mechanism (not shown) which counts the number of rotations of disc 57 to provide a readable indication of energy consumed.

Because the foregoing is conventional, and does not per se constitute a part of the invention, further detail as to construction and operation is omitted in the interest of brevity. Additional information, is available, for example, in Standard Handbook for Electrical Engineers, published by the McGraw Hill Book Company.

In accordance with a first embodiment of this invention, the above described conventional watthour meter is modified by the addition of two additional current coils 78 and 80 wound on stator poles 66 and 68. The number of turns in each of coils 78 and 80 is small, as in the case of conventional current coil 76 with the exact number of turns being determined by the desired effect on meter operation, as hereinafter explained.

Figure 4:
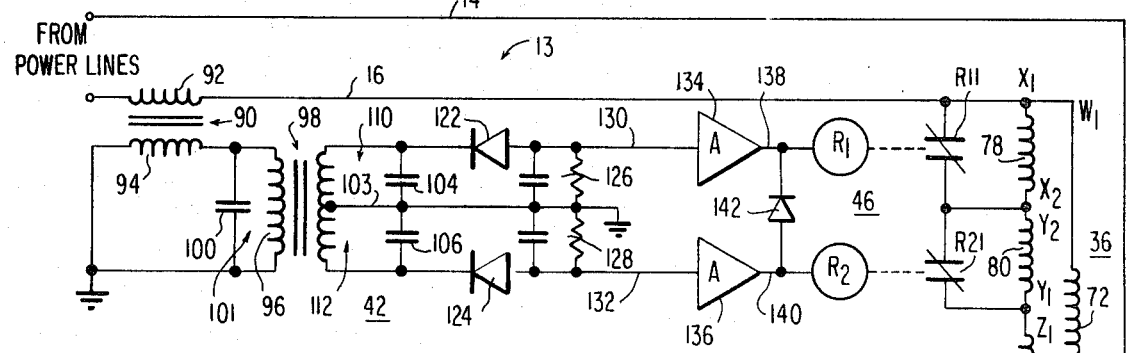
FIG. 4 is a circuit diagram of a control circuit employed to operate the meter at the desired rate to reflect variations of system demand.

FIG. 4 shows the manner in which current coils 76, 78 and 80 and potential coil 72 are interconnected and controlled to establish the desired demand metering operation in accordance with this invention. The system is described in terms of a three level rate structure as explained in connection with FIG. 1, but it should again be understood that four or more rate levels may be provided if desired, as long as the number of levels provided is not so great as to confuse the average user.

As will be recalled from description of FIG. 1, meter control information is provided from the power station over power line 13 in the form of control tones at frequencies $f_1$ and $f_2$. These frequencies are chosen sufficiently above 60 Hz as to be conveniently separable from the power frequency, but at the same time, sufficiently close to 60 Hz to permit transmission through the power transformers with minimum attenuation. Frequencies in the range of 100 – 200 Hz are quite satisfactory.

Turning to FIG. 4, control signal detector 42 comprises an input stepdown transformer 90 including a primary 92 connected in series with the hot side 16 of power line 13 and a secondary 94.

Transformer secondary 94 is connected in a series circuit with the primary 96 of a detection transformer 98. The latter is shunted by tuning capacitor 100 to form a tuned circuit 101 resonant at a center frequency $f_c$ according to the relationship $f_c = (f_1 + f_2)/2$. The "Q" of resonant circuit 101 is preferably sufficiently high that the circuit response at 60 Hz is substantially below that a frequencies $f_1$ and $f_2$. The latter is facilitated by choice of frequencies $f_1$ and $f_2$ in proper relation to the 60 Hz power line frequency as previously mentioned. For example, satisfactory results can be achieved for values of $f_1$ and $f_2$ of 110 Hz and 140 Hz respectively, or at even higher frequencies such as 200 Hz and 250 Hz, respectively.

The secondary of transformer 98 is comprised of a winding 102 having a grounded center tap 103. A pair of capacitors 104 and 106 are connected between the respective ends of winding 102 and center tap 103 to form a pair of tuned secondary circuits 110 and 112 resonant at frequencies $f_1$ and $f_2$ respectively. The "Q's" of resonant circuits 110 and 112 are made sufficiently high that the response of each of the resonant frequency of the other is quite small.

The outputs of tuned circuits 110 and 112 are connected through a pair of diodes 122 and 124 to respective long time constant RC circuits 126 and 128. The latter are grounded to center tap 103, thereby providing rectified outputs over leads 130 and 132 proportional to the response of resonant circuits 110 and 112. As will be understood, if tuned circuit 101 completely blocks the 60 Hz power, and if tuned circuits 110 and 112 are sufficiently sharply tuned to exclude the $f_2$ and $f_1$ signals respectively, a DC signal will be present on lead 130 only when an $f_1$ signal is present on power line 13, and a DC signal will be present on lead 132 only when an $f_2$ signal is present on power line 13. However, depending on the values chosen for frequencies $f_1$ and $f_2$ and the level of the signal voltages in relation to the 60 Hz voltage, the "Q's" required for the tuned circuits 101, 110 and 112 to achieve such operation may be quite high. Since inductance values at frequencies of 100 – 200 Hz will be on the order of millihenries, achievement of high Q values would require relatively large costly transformers formed of heavy gauge wire.

To alleviate the problem somewhat, there are provided two driver amplifiers 134 and 136 arranged to have threshold operating values above combined levels of the rectified 60 Hz signal and the unwanted $f_2$ signal in the case of amplifier 134, and the unwanted $f_1$ signal for amplifier 136. Thus, for amplifier 134, unless the $f_1$ signal is present, there will be a zero output on lead 138. Similarly, absent the $f_2$ signal, there will be a zero output for amplifier 136 on lead 140.

A pair of relay coils $R_1$ and $R_2$ are connected respectively to the outputs of amplifiers 134 and 136 to control the operating rate of meter 34, as will now be described.

Referring to FIGS. 2 and 4, the terminals of stator coils 72, 76, 78 and 80 have been denoted $W_1$ and $W_2$, $Z_1$ and $Z_2$, $Y_1$ and $Y_2$, and $X_1$ and $X_2$, respectively. Using the foregoing notation, it may be seen that coils 76, 78 and 80 are arranged with terminals $X_2$ and $Y_2$ and terminals $Y_1$ and $Z_1$ respectively connected together to provide a complete series circuit. Terminals $X_1$ and $Z_2$ are connected between the hot side 16 of incoming power line 13 and the corresponding side of the premises wiring to complete the meter current circuit. Likewise, potential coil 72 is connected in conventional fashion with terminal $W_1$ connected to "hot" side 16 of power line 13, and terminal $W_2$ connected to ground side 14.

In addition, coils 78 and 80 are arranged to be selectively short circuited by a pair of normally closed relay contact pairs R11 and R21 connected in series as illustrated in FIG. 4. Contact pairs R11 and R21 are operated by relay coils R1 and R2. Relay R1 is directly connected to the output of amplifier 134 and to the output of amplifier 136 through a diode 142. Relay R2 is connected to amplifier 136. Diode 142 isolates relay R2 from amplifier 134 (the latter being arranged to provide a (+) or zero output only).

Referring to FIGS. 1 – 4, operation of the metering portion of the system is as follows:

Whenever overall system demand is sufficiently low that neither of threshold detectors 25 or 26 is activated, oscillators 28 and 30 are inoperative and the $f_1$ and $f_2$ control signals are not present on power line 13. Thus, the control circuit outputs appearing in tuned circuits 110 and 112 are essentially 0. Correspondingly, current flow through diodes 122 and 124, and the outputs at 130 and 132 are below the input threshold levels for driver amplifiers 134 and 136. Relay coils R1 and R2 are not energized, and relay contacts R11 and R121 maintain short circuits across meter coils 78 and 80. As a result, the magnetic fields produced by stator poles 66 and 68 depend solely on the current flow through coil 76 and the meter may be regarded as operating in conventional fashion as described above.

If overall system demand reaches an intermediate level sufficient to operate demand threshold detector 25 (see FIG. 1) gated oscillator 28 is activated to provide the $f_1$ control signal through coupling transformer 32 on "hot" side 16 of power line 13. The $f_1$ signal is coupled through input transformer 90, and tuned primary 101 of transformer 98 to tuned secondary circuit 110, which resonates to produce a rectified DC signal on lead 130 of sufficient amplitude to overcome the operating threshold of driver amplifier 134 producing a (+) signal on lead 138. This energizes relay coil R1 and opens relay contacts R11.

As a result, the series portion of the meter drive circuit now includes windings 76 and 78 connected together through still closed relay contact R21. The magnetic flux produced by stator poles 66 and 68 is therefore increased, and the rotational speed of rotor disc 57 is correspondingly increased. This, in turn, increases the operating speed of gear train 88 and produces an apparent increase in the number of kilowatthours of energy consumed as indicated by the meter register.

Referring again to FIG. 1, if the overall system power demand is sufficient to operate demand threshold detector 26, gated oscillator 30 is activated and the $f_2$ control signal is coupled into the "hot" side 16 of power line 13 by coupling transformer 34. The $f_2$ signal is coupled through input transformer 90 and tuned circuit 101 to tuned secondary circuit 112, which resonates to produce a rectified DC output on lead 132 of sufficient amplitude to overcome the input threshold of amplifier 136, producing a (+) signal on lead 140. This energizes relay coil R2, which, in turn, opens relay contact pair R21.

In addition, current flow through diode 142 energizes relay coil R1 causing contact pair R11 to open, as well. As a result, the short circuits on both of meter coils 78 and 80 are removed and a complete series circuit is provided, including all of meter drive coils 76, 78 and 80. The resulting magnetic field produced by stator poles 66 and 68 is now at its highest level, and produces the maximum rotation speed of rotor disc 57. Correspondingly, gear train 88 operates at its maximum speed.

By selection of the number of turns in coils 78 and 80 in relation the number of turns in coil 76, the desired ratio of meter operating speeds may be obtained. For example, if the number of turns in each of coils 78 and 80 is exactly half the number of turns in coil 78, the meter will operate at an intermediate rate 1.5 times the slow rate and at a maximum rate of twice the low rate. As will be appreciated, other combinations of meter speeds may be obtained depending on the desired billing differentials to be employed.

Figure 5:
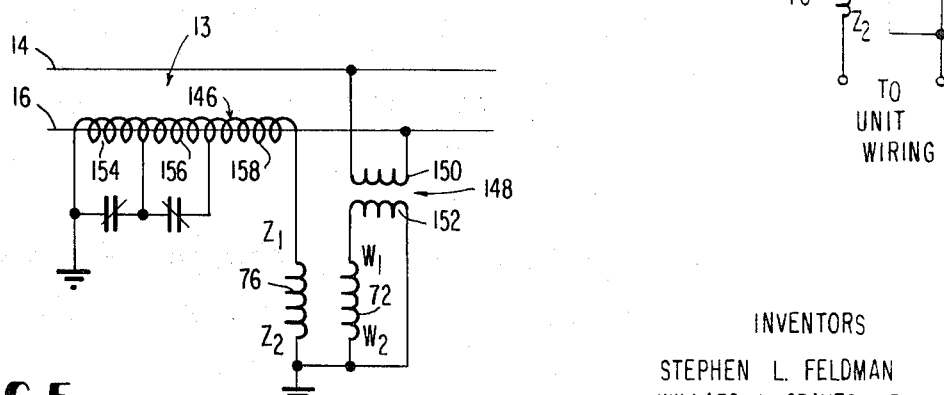
FIG. 5 is a fragmentary circuit diagram showing an alternative embodiment of part of the circuit shown in FIG. 4.

An alternative arrangement for meter 34 is shown schematically in FIG. 5. As will be recalled, the meter shown in FIGS. 2 and 3 differs from a conventional meter in that additional current windings 78 and 80 are provided for selective series interconnection with conventional current winding 74. For the embodiment of FIG. 5, only the conventional current coil 76 is employed. In this case, however, rather than direct series interconnection of meter coil 76 with "hot" side of power line 13, the meter is inductively coupled to the power line by means of a pickup coil 146. Similarly, a potential transformer 148 is provided, having its primary 150 connected between power lines 14 and 16 and its secondary 152 connected in series with meter potential coil 72.

The foregoing is also a conventional arrangement, frequently used where high current levels are encountered in power line 13, allowing use of relatively low current capacity meters. To adapt the foregoing to use in accordance with the present invention, current pickup coil 146 is formed of 3 series connected coil sections 154, 156 and 158. A normally closed relay contact pair R11, corresponding to contact pair R11 in FIG. 4, shunts pickup coil section 154 while a second normally closed relay contact pair R211 corresponding to contact pair R21 in FIG. 4, shunts pickup coil 156. The two contact pairs are connected in series as illustrated to provide a direct shunt path to ground across both of pickup coils 154 and 156 when the contact pairs are closed.

Referring to FIGS. 4 and 5, with neither of relays R1 nor R2 energized (i.e., in the absence of either control signals $f_1$ or $f_2$) relay contact pairs R111 and R211 are closed and the current flow through pickup coil 146 depends only on the number of turns in coil section 158. This, in turn, determines the current through meter drive coil 74 and consequently, the rotational speed of rotor disc 57.

With control signal $f_1$ present and relay R1 energized, as previously described, contact pair R111 is open and current sensing coil 146 comprises coil sections 154 and 158 connected in series through still closed relay contact pair R211. As a result, the current flowing through meter drive coil 76 is increased, and the meter operates at a faster speed. Finally, with the $f_2$ control signal present, relays R1 and R2 are both energized and all of pickup coil sections 154, 156 and 158 are operative to determine the current flow through meter drive coil 74, and the meter operates at its fastest speed. Thus, it may be seen that entirely equivalent results in terms of meter operating rate control are achieved with the embodiments of FIGS. 4 and 5.

As yet a further alternative, meter operating speed may be controlled mechanically, rather than electrically by employment of a variable speed gear train mechanism instead of the fixed speed mechanism 88 shown in FIG. 2. Any suitable three speed gearing mechanism may be employed, for example, that shown in co-pending United States patent application Ser. No. 45,329, filed June 11, 1970, in the name of Stephen L. Feldman. Speed changes with the aforementioned variable speed gear train may be obtained by any desired solenoid operated linkage in precisely the manner described in connection with FIG. 4 above.

As previously noted, a particular feature of the present invention resides in providing the consumer with a readily comprehensible indication of overall system demand and of his own consumption so that the effect of changes in his consumption will be immediately apparent. Referring again to FIG. 2 and 3, meter 36 includes means for providing an electrical signal analog of the meter operating speed.

This may be accomplished in several ways. For example, as illustrated in FIGS. 2 and 3, a small spot 160 of ferrite or other magnetically sensible material is provided on rotor disc 57. A magnetic sensor 162 is mounted in the meter housing in closely spaced relationship to magnetically sensible spot 160 so that each time disc 57 makes a complete rotation, a signal is produced by a sensing coil 162.

As shown in FIG. 1, the output of sensing coil 162 is connected over a lead 164, to tachometer generator 48 which operates in a conventional manner to produce a DC output signal on lead 166, proportional in amplitude to the pulse frequency output coil 162. This signal actuates the movement of meter 50 in cost display unit 40.

Meter 50 may be calibrated in any suitable fashion, for example, on a simple numerical basis. However, because each rotation of the meter disc corresponds to consumption of a definite quantity of energy (even though in a demand system this may not represent the quantity of energy actually consumed), the number of rotations recorded by the meter registering mechanism is regarded simply as a measure of the cost of electricity. Accordingly, the rate of operation of the registering mechanism, and correspondingly, the rate of rotation of rotor disc 57 represents the cost per unit of time of electricity consumed. Therefore, the scale for meter 50 which measures the speed of rotation of disc 57 is preferably calibrated in terms of a convenient cost per unit of time, e.g., for example, cents per hour, dollars per day, etc. This provides the consumer with an immediately comprehensible measure of his electricity consumption, and in fact, the most meaningful scale for the average consumer.

At the same time, display unit 40 provides the consumer with an indication of overall system demand level. Comparing FIGS. 1 and 4, the outputs of amplifiers 134 and 136 are connected respectively to lamps 52 and 54 in display unit 40. With neither the $f_1$ nor the $f_2$ signal present, the meter is not illuminated representing the condition of lowest system demand. If either of lamps 52 or 54 is on, then the respective indicator will be illuminated and the consumer will know immediately that reducing his power consumption will produce a financial advantage to him. Then, by observing the change in the reading on scale 50 (in terms of cents per hour being expended), the consumer can readily determine the effect, for example, of turning off an air conditioning unit, an electric iron, etc., and can readily make a determination of whether the inconvenience resulting from he altered consumption is justified by the decreased cost.

The display arrangement described above is particularly convenient for installations where the power consumption display 40 is to be located adjacent demand meter 36, or in new construction applications where the necessary wiring between control signal detector 42 and tachometer 48 and display 40 may be readily installed. In the latter case, several display units may be located at strategic points throughout the premises for convenient consumer access.

However, when the demand metering system is to be installed in a preexisting dwelling or other premises at a location remote from the demand meter 36, substantial inconvenience may be encountered in installation of the signalling cables, particularly if more than one consumption display unit is desired. Under such circumstances, a somewhat more expensive but more flexible arrangement employing a "plug-in" display unit may be preferable.

A circuit diagram for such an arrangement is shown in FIG. 6. Here, the outputs of amplifiers 134 and 136 (see FIG. 4) are connected respectively to a pair of gated oscillators 170 and 172 operating at frequencies $f_3$ and $f_4$, preferably at the upper end of the audio frequency band, for example, at 25 kHz and 30 kHz, respectively. The outputs of oscillators 170 and 172 are connected to a suitable summing amplifier 174, the output of which is connected to one end 176 of the drain-source signal path of an MOS transistor 178. The gate terminal of transistor 178 is connected to the output of tachometer 48.

The other end 180 of the source-drain signal path of transistor 178 is connected to ground through a load resistor 182, which, in turn, comprises part of an RLC circuit 184, also including a capacitor 186 and the primary 188 of a coupling transformer 190, the secondary 192 of which is coupled in series into the "hot" side of the premises power line. RLC circuit 184 is tuned to a frequency midway between the frequencies of oscillators 170 and 172 and is provided with a bandwidth sufficiently wide to pass only the two oscillator signals.

In operation, when either of amplifiers 134 or 136 provides an output signal, one of gated oscillators 170 or 172 operates, providing an AC input for MOS transistors 178. The latter operates as a voltage controlled resistor with the current flow through the source-to-drain signal path 176, 180 dependent on the level of the signal on gate 179. Since this in turn is determined by the DC output of tachometer 48, it may be appreciated that the amplitude of the signal coupled into tuned circuit 184 will be determined by the rotational frequency of demand meter 36, with the frequency being indicated by whichever one of oscillators 170 or 172 is activated.

The portable consumption display device comprises a plug-in unit 40' having a conventional plug 194 for insertion into a conveniently located power outlet, a high pass filter 196 having a cutoff frequency at or slightly below that of gated oscillator 170 (to block the 60 Hz power), a rectifier circuit 198 and tuned circuits 200 and 202 resonant at the respective frequencies $f_3$ and $f_4$. The output of rectifier 198 is connected to a cost display meter 50', corresponding to meter 50 in FIG. 1, while tuned circuits 200 and 202 are connected respectively to lamps 52' and 54', corresponding to lamps 52 and 54 in FIG. 1.

In operation, if either the $f_3$ or $f_4$ signal is present, rectifier circuit 198 produces a DC signal having an amplitude proportional to the consumption signal analog provided by tachometer 48. This operates display meter 50' in the manner described above in connection with meter 50 to provide a dollars per hour consumption indication for the consumer. Likewise, the presence of one of the $f_3$ or $f_4$ signals actuates the respective one of tuned circuits 200 or 202 to operate one lamp 52' or 54'. The arrangement shown in FIG. 6 is somewhat more complex, and thus more expensive than the "wired-in" arrangement of FIG. 1, but such higher cost may be justified where a conveniently portable display unit is desired.

In the foregoing, there has been described an improved demand metering system for electrical energy which overcomes the disadvantages of previously known systems. While specific embodiments have been described, it should be understood that several variations which will be apparent to those skilled in the art in light of the foregoing disclosure are also contemplated.

For example, although the invention has been shown and described in connection with a two-wire single phase system for simplicity, it should be understood that the techniques disclosed are directly applicable to three-wire single phase systems and to polyphase systems as well.

Further, with reference to the circuit shown in FIGS. 4 and 5, an electronic switching arrangement employing silicon controlled rectifier (SCR) circuitry may be substituted for the relay-contact pair arrangement shown. Simple SCR control circuitry may be provided, or to eliminate transients, a more sophisticated arrangement may be provided with zero crossing detection to switch the meter drive coils into and out of the circuit when the current in power line 13 is at a zero value. Other conventional or desired spark or transient suppression circuitry may also be employed either in the contactor embodiment of FIGS. 4 and 5 or with the solid state alternative.

Also, the magnetic tachometer arrangement described may be replaced by an optical system having a light source adapted to shine through an aperture in disc 47 to impinge on a photosensor. In addition, in the portable display embodiment of FIG. 6, a third oscillator may be provided which operates when neither the $f_3$ nor the $f_4$ signal is present so the cost display meter will be operative even during periods of low demand.

In addition, of course, other variations in the circuitry shown, e.g., employment of high or low pass filters instead of the tuned circuits shown, will also be apparent.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Metering apparatus for an electrical energy distribution system having a power generating station and a plurality of consumer stations interconnected by a power line, said metering apparatus comprising: an electric meter at each consumer station, said meter including means for recording consumption of electricity in units of energy, control circuit means for adjusting the meter operating speed to vary the relationship between the number of energy units recorded by said meter and the number of energy units actually used by the associated consumer station; control signal generating means associated with said system said control signal generating means comprising means for measuring the aggregate power demand of the consumer stations in the system, means for generating control signals representative of said power demand and means for coupling said control signals into said power line; control signal detector means at each consumer station including coupling means connected to said power line, means connected to said coupling means and responsive to said control signal for operating said control circuit means to adjust said meter operating rate in a predetermined relationship to the overall level of power demand in the system; and display means for indicating both the level of overall system demand and the rate at which units of electrical energy are being recorded by said electric meter.

2. Metering apparatus as defined in claim 1 wherein said meter comprises a stator and a rotor, first coil means on said stator for connection to said power line to produce a magnetic field in said stator as a function of the power line voltage, second coil means on said stator for connection to said power line to produce a magnetic field in said stator as a function of the current in said power line, and switching means connected to said control circuit means for controlling the intensity of the stator magnetic field resulting from a given power line voltage and current.

3. Metering apparatus as defined in claim 2 wherein said second coil means comprises at least three separate coils, and wherein said switching means is arranged selectively to connect said coils in a series circuit with said power line.

4. Metering apparatus as defined in claim 3 wherein said three separate coils are connected in series, and wherein said switching means comprises two switch elements, respectively, shunting two of said separate coils.

5. Metering apparatus as defined in claim 2 including means for inductively coupling said second coil means to said power line, said coupling means comprising three separate coils, and said switching means being arranged selectively to connect said three coils in a series circuit.

6. Metering apparatus as defined in claim 1 wherein said control signal generating means comprises means for generating at least two different control signals in response to two ranges of power demand in the system and wherein said control signal detector comprises means for recognizing said two control signals, and actuator means for establishing first and second meter operating rates corresponding to said first and second signals, and a third operating rate in the absence of either of said first and second signals.

7. Metering apparatus as defined in claim 6 wherein said means for generating said first and second signals comprise means for producing said signals at two spaced frequencies different from the frequency of AC power distributed by the system.

8. Metering apparatus as defined in claim 1 wherein said electric meter comprises a rotary electromechanical energy converter, and wherein said display means comprises means to measure the rotational speed of said meter, and means to display an analog of said rotational speed in terms of electricity cost per unit of time.

9. Metering apparatus as defined in claim 8 wherein said control signal generating means comprises means for generating at least two different control signals at different frequencies in response to two ranges of power demand in the system and wherein said control signal detector comprises first means responsive to one of two frequencies, second means responsive to the other of said two frequencies, and actuator means for establishing first and second meter operating rates in response to the presence of signals at said first and second frequencies, and a third operating rate in the absense of signals at either of said first and second frequencies, and wherein said display means includes first and second indicators operable in response to respective ones of said first and second signals.

10. Metering apparatus as defined in claim 1 further including means coupled to said control signal detector for generating an information signal identifying different ranges of overall power system demand, means for modifying said information signal to reflect the rate at which energy is being used at said consumer station, and means for coupling said modified information signal into the power line at said consumer station.

11. Metering apparatus as defined in claim 10 wherein said information signal is generated at different frequencies to reflect said different ranges of demand, and wherein said means for modifying said signal comprises means for varying the amplitude thereof in accordance with the actual rate of operation of said meter.

12. Metering apparatus as defined in claim 11 wherein said display means includes plug in means for connection to a power outlet in said consumer station, means to measure the amplitude of said information signal, means to display an analog of said amplitude in terms of cost of power consumption per unit of time, means to identify the frequency of said information signal and means to display the identity of said frequency in terms of the corresponding range of system demand.

13. A variable rate electric meter for a demand metering system comprising a stator, a rotor, first coil means on said stator for connection to a power line to produce a magnetic field in said stator as a function of the power line voltage, second coil means on said stator for connection to said power line to produce a magnetic field in said stator as a function of the current in said power line, and control means including switch means for controlling the intensity of the stator magnetic field resulting from a given power line voltage and current.

14. Metering apparatus as defined in claim 13 wherein said second coil means comprises at least three separate coils, and wherein said switching means is arranged selectively to connect said coils in a series circuit with said power line.

15. Metering apparatus as defined in claim 14 wherein said three separate coils are connected in series, and wherein said switching means comprises two switch elements, respectively, shunting two of said separate coils.

16. Metering apparatus as defined in claim 13 including means for inductively coupling said second coil means to said power line, said coupling means comprising three separate coils, and said switching means being arranged selectively to connect said three coils in a series circuit.

17. Metering apparatus for an electrical energy distribution system having a power generating station and a plurality of consumer stations interconnected by a power line, said metering apparatus comprising: an electric meter at each consumer station, said meter including means for recording consumption of electricity in units of energy, control means at each consumer station for adjusting the meter operating speed to vary the relationship between the number of energy units recorded by the meter and the number of energy units actually used by the consumer station; control signal generating means associated with said system, said control signal generating means comprising means for measuring the aggregate power demand of the consumer stations in the system, means for generating control signals representative of said demand; means for providing said control signals to each consumer station; control signal detector means at each consumer station responsive to said control signal for operating the control means at said consumer station to adjust said meter operating rate in a predetermined relationship to the overall level of power demand in the system; and display means for indicating both the level of overall system demand and the rate at which units of electrical energy are being recorded by said electric meter.

18. Metering apparatus as defined in claim 17 wherein said meter comprises a stator and a rotor, first coil means on said stator for connection to said power line to produce a magnetic field in said stator as a function of the power line voltage, second coil means on said stator for connection to said power line to produce a magnetic field in said stator as a function of the current in said power line, and means in said control means for adjusting the intensity of the stator magnetic field resulting form a given power line voltage and current.

19. Metering apparatus as defined in claim 18 wherein said second coil means comprises at least three separate coils, and wherein said control means is selectively operable to connect said coils in a series circuit with said power line.

20. Metering apparatus as defined in claim 19 wherein said three separate coils are connected in series, and wherein said control means includes switching means comprising two switch elements, respectively shunting two of said separate coils.

21. Metering apparatus as defined in claim 18 including means for inductively coupling said second coil means to said power line, said coupling means comprising three separate coils, and wherein said control means includes switching means selectively operable in response to said control signal to connect said three coils in a series circuit.

22. A variable rate electric meter for a demand metering system comprising a stator; a rotor; first coil means on said stator for connection to a power line to produce a magnetic field in said stator as a function of the power line voltage; second coil means on said stator for connection to said power line to produce a magnetic field in said stator as a function of the current in the power line; control mean responsive to a remotely generated control signal indicative of the overall level of system energy demand for controlling the intensity of the stator magnetic field resulting from a given power line voltage and current; and display means for indicating both the level of overall system demand and the rate of usage of electrical energy recorded by said electric meter.

23. The variable rate of electric meter of claim 22 further including means coupled to said control means for generating an information signal identifying different ranges of overall system energy demand; means for modifying said information signal to reflect the rate of usage of electrical energy recorded by said meter; and means for coupling said modified information signal into the power line.

24. The meter of claim 23 wherein said information signal is generated at different frequencies to reflect said different ranges of demand, and wherein said means for modifying said signal comprises means for varying the amplitude thereof in accordance with the actual rate of operation of said meter.

25. The meter of claim 24 wherein said display means includes plug-in means for connection to a power outlet; means to measure the amplitude of said information signal; means to display an analog of said amplitude in terms of cost of power consumption per unit of time; means to identify the frequency of said information signal; and means to display the identity of said frequency in terms of the corresponding range of system demand.

* * * * *

UNITED STATES PATENT OFFICE
CERTIFICATE OF CORRECTION

Patent No. 3,683,343      Dated August 8, 1972

Inventor(s) STEPHEN FELDMAN and WILLIARD GRAVES

It is certified that error appears in the above-identified patent and that said Letters Patent are hereby corrected as shown below:

In Column 1, line 41, "for time" should read --for a time--; line 46, "lowe" should read --lower--.

In Column 3, line 10, "electrical" should read --electric--.

In Column 4, line 66, "sides or" should read --sides of--.

In Column 6, line 17, "a" should read --at--; line 29, " "Q's' " should read --"Q's"--; line 30, " ' ", appearing at the beginning of the line, should be canceled; line 57, "combined" should read --the combined--.

In Column 10, line 22, "he" should read --the--.

In Column 11, line 2, "transistors" should read --transistor--.

In Column 15, line 4, Claim 18, "form" should read --from--; line 30, Claim 22, "mean" should read --means--.

Signed and sealed this 30th day of January 1973.

(SEAL)
Attest:

EDWARD M. FLETCHER, JR.
Attesting Officer

ROBERT GOTTSCHALK
Commissioner of Patents